United States Patent [19]
Morita

[11] Patent Number: 5,504,734
[45] Date of Patent: Apr. 2, 1996

[54] OPTICAL DISC

[75] Inventor: Seiji Morita, Yokohama, Japan

[73] Assignee: Nikon Corporation, Tokyo, Japan

[21] Appl. No.: 249,970

[22] Filed: May 27, 1994

[30] Foreign Application Priority Data

Jun. 15, 1993 [JP] Japan .................. 5-144073

[51] Int. Cl.$^6$ ........................... G11B 7/24
[52] U.S. Cl. .................. 369/275.4; 369/275.1; 369/275.3
[58] Field of Search .................. 369/275.1, 275.4, 369/275.3, 275.2

[56] References Cited

U.S. PATENT DOCUMENTS 4,734,904  3/1988  Imanaka .................. 369/275.4
5,106,721  4/1992  Van Liempd et al. .................. 430/320
5,325,353  6/1994  Sasaki .................. 369/275.2

FOREIGN PATENT DOCUMENTS 0527602  2/1993  European Pat. Off. ............ 369/275.4
1-258244  10/1989  Japan .................. 369/275.4

*Primary Examiner*—David C. Nelms
*Assistant Examiner*—Son Mai
*Attorney, Agent, or Firm*—Shapiro and Shapiro

[57] ABSTRACT

An optical disc is formed with a land and a groove, and information is recorded on one of the land and the groove. Track pitch P and the width W of the other of the land and the groove satisfy the following conditions:

when $P > 1.2 \ \mu m$, $W \leq 0.217P$;

when $P \leq 1.2 \ \mu m$, $W \leq 0.278P$.

7 Claims, 2 Drawing Sheets

OPTICAL DISC

BACKGROUND OF THE INVENTION

1. Field of the Invention

This invention relates to an optical disc, and more particularly to an optical disc which can reduce the fluctuation of reflectance in the land portion or groove portion thereof and can reproduce information accurately and quickly.

2. Related Background Art

Optical discs which can rapidly process high density information have been attracting attention as new computer external memories. Optical discs having a diameter of 5.25 inches include the write once type which is capable of writing information only once and the magneto-optical type which is capable of rewriting information. Also, optical discs having a diameter of 3.5 inches include the magneto-optical type, the ROM type which is exclusively for use for reproduction, and the partial ROM type in which the magneto-optical type and the ROM type are combined, and these are standardized by the ISO standards and therefore are expected to spread more widely in the market in the future.

In these optical discs, a guide for directing a laser spot from the pickup of a recording-reproducing apparatus along information, i.e. for tracking, is formed spirally or concentrically from the inner periphery toward the outer periphery of the disc in the form of a concave or convex groove.

The structure of the optical disc will hereinafter be described in greater detail with reference to FIG. 1 of the accompanying drawings. A portion which is concave when viewed from a pickup 4, that is, which is far from the pickup 4, is called a land 1, and a portion which is convex when viewed from the pickup 4, that is, which is near to the pickup 4, is called a groove 2. Also, the distance from the center of a land to the center of an adjacent land is called a track pitch 3. In this structure, information can be written into either the land 1 or the groove 2, but many optical discs adopt the land recording type in which information is written into the land portion.

The grooves of optical discs of the land recording type which are now put into practical use include two kinds, i.e., U-shaped grooves as shown in FIG. 2 of the accompanying drawings, and V-shaped grooves as shown in FIG. 3 of the accompanying drawings. In the case of the U-shaped groove, the groove width W thereof is defined as W=(Wtop+Wbottom)/2 when the width at the top of the groove is Wtop (5) and the width at the bottom of the groove is Wbottom (6). In the case of the V-shaped groove, the groove width W thereof is defined as W=Wtop (5). In any case, the land width is defined by "track pitch P-groove width W". That is, in the U-shaped groove, the land width=P-(Wtop+Wbottom)/2, and in the V-shaped groove, the land width=P-Wtop.

It has generally been the case that the groove width W is 0.4 μm–0.6 μm and the track pitch is 1.6 μm, but recently, there have been reported optical discs in which the track pitch is 1.4 μm or 1.2 μm to realize a narrow track pitch in order to record higher density of information.

In the conventional optical discs, particularly when the track pitch is smaller than 1.6 μm, the reflectance of the land portion (the quantity of light returning to a signal detector (photosensor) in the pickup when the laser spot is positioned on the center of the land) unavoidably fluctuates due to the minute irregularity of the groove width, groove depth and track pitch attributable to the fluctuations of conditions during the manufacture of the optical discs and the minute irregularity of the reflectances of recording film and reflecting film. This has led to the undesirable result that the error of the writing or reading of information occurs or a tracking error occurs during high-speed search or access, thus presenting a significant problem in the narrowing of the track pitch of the optical disc.

SUMMARY OF THE INVENTION

This invention has been made in view of the circumstances as noted above and an object thereof is to provide a novel optical disc which can decrease the amount of fluctuation of the reflectance of the land portion occurring due to the fluctuations of conditions during the manufacture of the optical disc and which can reproduce information accurately and quickly.

To solve the above-noted problem, this invention provides an optical disc in which information is recorded on one of a land and a groove and the track pitch P and the width of the other of the land and the groove satisfy the following conditions:

when P>1.2 μm, W≦0.217P;

when P≦1.2 μm, W≦0.278P.

Further, it is preferable if 0.143P≦W is satisfied.

In this invention, as described above, the track pitch (P) and groove width or land width (W) of the optical disc are in a unique correlation, and this is based on the following.

First, to effect recording or reproduction, for example, on an optical disc of the land recording type accurately and to realize high-speed search and access functions, it becomes necessary that on the whole surface of the information recording area of the optical disc, the absolute value of the amount of fluctuation ($\Delta I_L$) of the reflectance of the land portion (the quantity of light returning to a signal detector (photosensor) in a pickup when a laser spot is positioned on the center of the land: $I_L$) be small.

$\Delta I_L$ is usually expressed by the following equations by the use of the average value ($I_{Lavg}$) of the maximum value ($I_{Lmax}$) or the minimum value ($I_{Lmin}$) of $I_L$ on the whole surface of the information recording area of the optical disc and $I_L$, and $I_L$ minus the reflectance of the groove portion (the quantity of light returning to the signal detector (photosensor) in the pickup when the laser spot is positioned on the center of the groove: $I_G$), i.e., the average value ($I_L$–$I_G$)$_{avg}$ of the degree of modulation of a track cross signal.

$\Delta I_L$(positive value)=[($I_{Lmax}$–$I_{Lavg}$)/($I_L$–$I_G$)$_{avg}$] ×100(%)

$\Delta I_L$(negative value)=[($I_{Lmin}$–$I_{Lavg}$)/($I_L$–$I_g$)$_{avg}$]×100(%)

Whether the absolute value of $\Delta I_L$ becomes great or small is related to the width and depth of the groove. The present inventor has conducted a study regarding the width and depth of a groove which make the absolute value of $\Delta I_L$ small when the track pitch becomes smaller than 1.6 μm, and as a result, has found that $\Delta I_L$ is more dependent on the width of the groove than on the depth of the groove, and further has found that when the width of the groove is within a particular range, the absolute value of $\Delta I_L$ becomes small.

When the track pitch (P) is of a value smaller than 1.6 μm and greater than 1.2 μm as this invention teaches, if the groove width (W) is made equal to or less than 5/23 of (0.217 times) of the track pitch, it will be possible to make the absolute value of $\Delta I_L$ small. Also, it is preferable if the groove width (W) is made equal to or greater than 1/7 of (0.143 times) the track pitch (P).

When the track pitch (P) is of a value equal to or less than 1.2 μm, if the groove width (W) is made equal to or less than 5/18 of (0.278 times) of the track pitch (P), it will be possible to make the absolute value of $\Delta I_L$ small. Also, it is preferable if the groove width (W) is made equal to or greater than 1/7 of (0.143 times) of the track pitch (P).

In the foregoing, description has been made of an optical disc of the land recording type, but what has been described above also holds true of an optical disc of the groove recording type. However, in the case of the groove recording type, it is necessary that not the width of the groove but the width of the land be of a value within the aforementioned range, because information is recorded into the groove portion.

DESCRIPTION OF THE PREFERRED EMBODIMENTS

Figure 1:
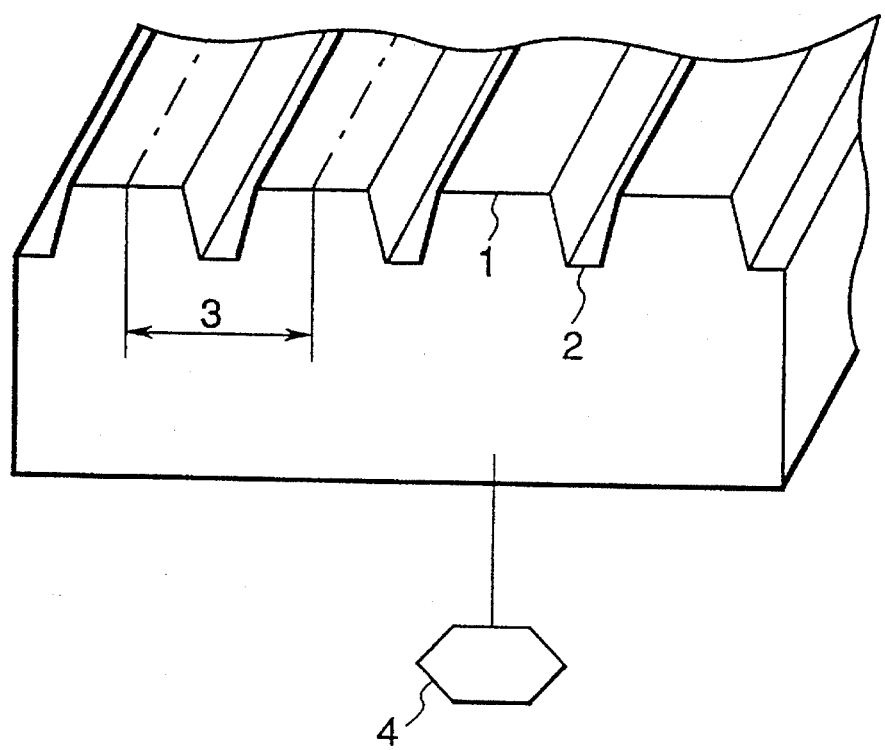
FIG. 1 is a conceptual perspective view illustrating the structure of the land and groove of an optical disc.
Figure 2:
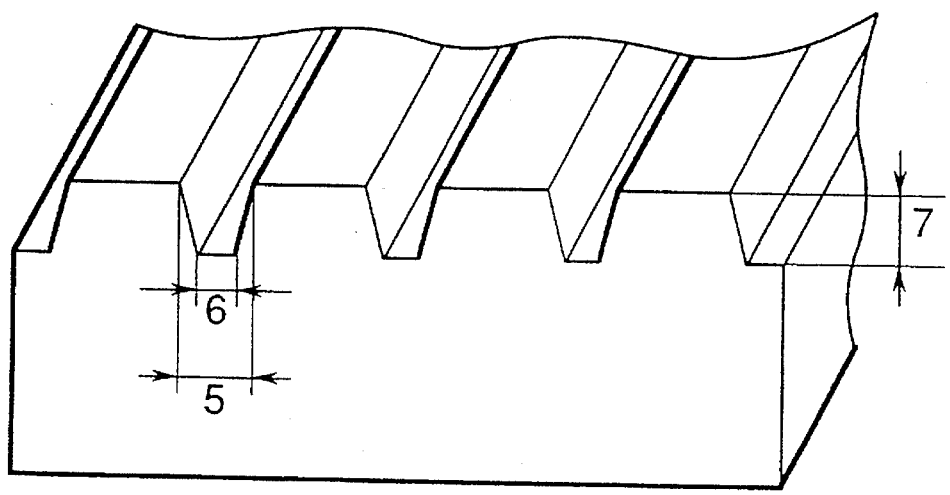
FIG. 2 is a conceptual perspective view illustrating U-shaped grooves.
Figure 3:
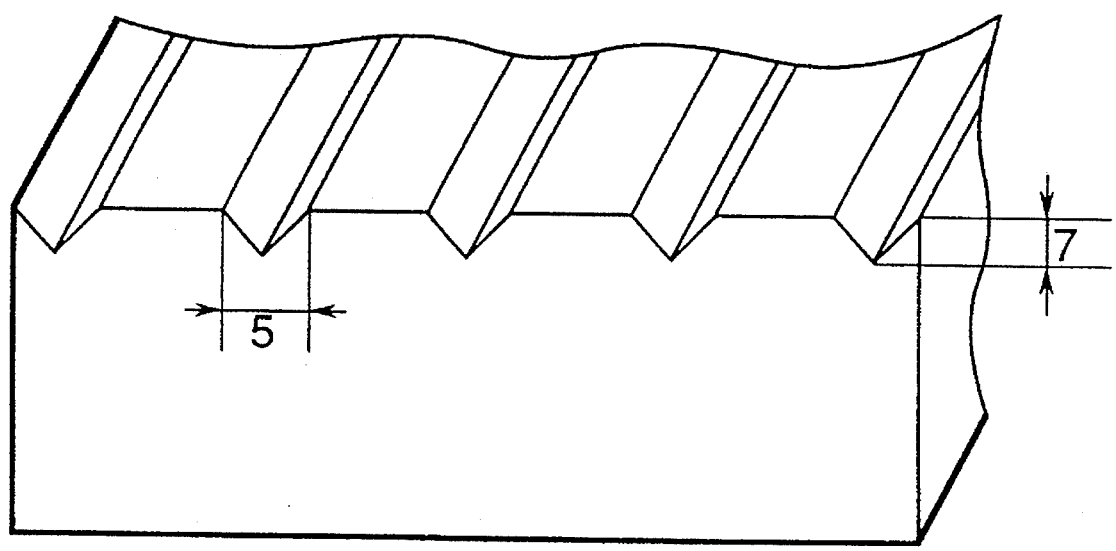
FIG. 3 is a conceptual perspective view illustrating V-shaped grooves.

This invention will hereinafter be described in greater detail with respect to some embodiments thereof.

Embodiment 1

An optical disc having a track pitch of 1.4 μm and a groove width of 0.3 μm (that is, the groove width being 0.214 times the track pitch) was made in accordance with the present invention. Also, for comparison, an optical disc having a track pitch of 1.4 μm and a groove width of 0.4 μm (that is, the groove width being 0.286 times the track pitch) like the prior-art optical disc was made. The value of $\Delta I_L$ in each case was measured. The result is shown in Table 1 below.

The groove depth was 900 Å, the irregularity of the track pitch on the whole surface of the information recording area of the optical disc was ±0.03 μm, the irregularity of the groove width was ±0.01 μm, the irregularity of the groove depth was ±30 Å, and the irregularity of the reflectance of reflecting film was ±10%. Reproduction conditions were thus: the wavelength of a laser was 780 nm, the numerical aperture (N.A.) of the objective lens of an optical head for reproduction was 0.55, the wave front aberration was rms=0.03λ, the laser beam when it was incident on the disc was linearly polarized light, and the direction of polarization was a direction parallel to the groove. Also, the spot diameter of the laser beam (i.e., the diameter which is $1/e^2$ of the center intensity in the intensity distribution of the cross-section of the incident laser beam) was equal to the aperture diameter of the objective lens (i.e., the diameter of the exit pupil of the objective lens).

TABLE 1

| Test | Track pitch | Groove width | $\Delta I_L$ |
| --- | --- | --- | --- |
| Embodiment 1 | 1.4 μM | 0.3 μm | −26.8% |
| Comparative Ex. 1 | 1.4 μm | 0.4 μm | −30.0% |

From Table 1, the value of $\Delta I_L$ is apparently smaller in the embodiment of this invention. Accordingly, it is seen that the amount of fluctuation of the reflectance of the land portion is reduced by the optical disc of this invention.

Embodiment 2

An optical disc having a track pitch of 1.2 μm and a groove width of 0.3 μm (that is, the groove width being 0.25 times the track pitch) was made in accordance with the present invention. In addition, an optical disc having a track pitch of 1.2 μm and a groove width of 0.4 μm (that is, the groove width being 0.333 times the track pitch) like the prior-art optical disc was made as a comparative example. The value of $\Delta I_L$ was measured for each of these optical discs. The result is shown in Table 2 below.

The groove depth was 800 Å, the irregularity of the track pitch on the whole surface of the information recording area of the optical disc was ±0.03 μm, the irregularity of the groove width was ±0.01 μm, the irregularity of the groove depth was ±30 Å, and the irregularity of the reflectance of recording film was ±10%.

Also, reproduction conditions were thus: the wavelength of the laser was 670 nm, the numerical aperture (N.A.) of the objective lens was 0.55, the wave front aberration was rms=0.03λ, the laser beam when incident on the disc was linearly polarized light, and the direction of polarization was a direction parallel to the groove. The condition about the spot diameter of the laser was similar to that in Embodiment 1.

TABLE 2

| Test | Track pitch | Groove width | $\Delta I_L$ |
| --- | --- | --- | --- |
| Embodiment 2 | 1.2 μM | 0.3 μm | −27.0% |
| Comparative Ex. 2 | 1.2 μm | 0.4 μm | −31.1% |

From Table 2, the value of $\Delta I_L$, in terms of the absolute value, is apparently smaller in the embodiment of this invention. Accordingly, it is seen that the amount of fluctuation of the reflectance of the land portion is reduced by the optical disc of this invention.

Embodiment 3

An optical disc having a track pitch of 1.1 μm and a groove width of 0.3 μm (that is, the groove width being 0.273 times the track pitch) was made in accordance with the present invention. In addition an optical disc having a track pitch of 1.1 μm and a groove width of 0.4 μm (that is, the groove width being 0.364 times the track pitch) like the prior-art optical disc was made as a comparative example. The value of $\Delta I_L$ for each of these optical discs was measured. The result is shown in Table 3 below.

The groove depth was 800 Å, the irregularity of the track pitch on the whole surface of the information recording area of the optical disc was ±0.02 μm, the irregularity of the groove width was ±0.01 μm, the irregularity of the groove depth was ±30 Å, and the irregularity of the reflectance of recording film was ±10%. Also, reproduction conditions were thus: the wavelength of the laser was 670 nm, the numerical aperture (N.A.) of the objective lens was 0.60, the wave front aberration was rms=0.03λ, the laser beam when incident on the disc was linearly polarized light and the direction of polarization was a direction parallel to the groove. The condition about the spot diameter of the laser was the same as that in Embodiment 1.

TABLE 3

| Test | Track pitch | Groove width | $\Delta I_L$ |
| --- | --- | --- | --- |
| Embodiment 3 | 1.1 μM | 0.3 μm | −27.6% |
| Comparative Ex. 3 | 1.1 μm | 0.4 μm | −37.4% |

From Table 3, the value of $\Delta I_L$, in terms of the absolute value, is apparently smaller in the embodiment of this invention. Accordingly, it is seen that the amount of fluctuation of the reflectance of the land portion is reduced by the optical disc of this invention.

As described above, by the optical disc of this invention, it becomes possible to suppress the amount of fluctuation of the reflectance of the land portion or the groove portion to a small value, and accurate and quick recording and reproduction of information become possible.

What is claimed is:

1. In an optical disc having a plurality of tracks defined by lands and grooves, and wherein information is recorded on one of said lands and said grooves, the improvement characterized in that track pitch P and the width W of the other of said lands and said grooves satisfy the following conditions:

$P \leq 1.2$ μm and $W \leq 0.278P$.

2. An optical disc according to claim 1, further satisfying the following condition:

$0.143P \leq W$.

3. In an optical disc of the land recording type having a plurality of tracks defined by lands and grooves, and wherein information is recorded on said lands, the improvement characterized in that track pitch P and groove width W satisfy the following conditions:

$P \leq 1.2$ μm and $W \leq 0.278P$.

4. An optical disc according to claim 3, wherein the track pitch P and the groove width W further satisfy the following condition:

$0.143P \leq W$.

5. An optical disc according to claim 3, wherein the groove width is 0.3 μm.

6. In an optical disc of the groove recording type having a plurality of tracks defined by lands and grooves, and wherein information is recorded on said grooves, the improvement characterized in that track pitch P and land width W satisfy the following conditions:

$P \leq 1.2$ μm and $W \leq 0.278P$.

7. An optical disc according to claim 6, wherein the track pitch P and the land width W further satisfy the following condition:

$0.143P \leq W$.

* * * * *